United States Patent [19]

Smith et al.

[11] Patent Number: 6,103,382
[45] Date of Patent: Aug. 15, 2000

[54] CATALYZED MICA TAPES FOR ELECTRICAL INSULATION

[75] Inventors: James D. B. Smith, Monroeville; Karl F. Schoch, Jr., Pittsburgh, both of Pa.; Franklin T. Emery, Orlando, Fla.

[73] Assignee: Siemens Westinghouse Power Corporation, Orlando, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/818,483

[22] Filed: Mar. 14, 1997

[51] Int. Cl.[7] .............................. B32B 5/16; B32B 27/38; B32B 17/10
[52] U.S. Cl. .......................... 428/417; 428/324; 428/363; 428/377; 428/413; 428/414; 428/415; 336/209
[58] Field of Search .................................... 428/413, 414, 428/415, 417, 363, 377, 324; 336/209

[56] References Cited

U.S. PATENT DOCUMENTS

| | | | |
|---|---|---|---|
| 3,556,925 | 1/1971 | Mertens | 161/163 |
| 3,647,611 | 3/1972 | Mertens | 161/163 |
| 3,801,392 | 4/1974 | Scheel et al. | 156/51 |
| 3,841,959 | 10/1974 | Mertens | 161/163 |
| 4,013,987 | 3/1977 | Foster | 336/206 |
| 4,112,183 | 9/1978 | Smith | 428/363 |
| 4,160,178 | 7/1979 | Smith et al. | 310/43 |
| 4,173,593 | 11/1979 | Smith et al. | 525/109 |
| 4,224,541 | 9/1980 | Smith et al. | 310/45 |
| 4,254,351 | 3/1981 | Smith et al. | 310/45 |
| 4,296,018 | 10/1981 | Smith et al. | 260/32.8 EP |
| 4,336,302 | 6/1982 | Ihlein | 428/324 |
| 4,356,417 | 10/1982 | Smith et al. | 310/43 |
| 4,374,892 | 2/1983 | Roberts | 428/233 |
| 4,606,785 | 8/1986 | Zeise | 156/305 |
| 4,656,090 | 4/1987 | Markovitz | 428/364 |
| 4,769,276 | 9/1988 | Gruss et al. | 428/251 |
| 5,075,159 | 12/1991 | Koyama et al. | 428/222 |
| 5,158,826 | 10/1992 | Ihlein et al. | 428/324 |
| 5,290,614 | 3/1994 | Narushima et al. | 428/40 |
| 5,298,304 | 3/1994 | Narushima et al. | 428/40 |
| 5,350,638 | 9/1994 | Sawada et al. | 428/623 |
| 5,372,886 | 12/1994 | Inazawa et al. | 428/384 |
| 5,523,137 | 6/1996 | Sei et al. | 428/41.7 |
| 5,618,891 | 4/1997 | Markovitz | 525/481 |
| 5,656,350 | 8/1997 | Koyama et al. | 428/66.6 |

OTHER PUBLICATIONS

Patent Abstracts of Japan, pub No. 07149928, Jun. 13, 1995, "Production of Prep Prepreg for Electric Insulation and Mica Type."

Patent Abstracts of Japan, pub. No. 01218342, Aug. 31, 1989, "Insulating Method for High–Voltage Rotary Electric Machine."

"A New Mica–Free Turn Insulation for Rotating HV Machines", Conference Record of the 1994 IEEE International Symposium on Electrical Insulation, Pittsburgh, Pennsylvania, Jun. 5–8, 1994, 482–484.

"IEEE Recommended Practice for Measurement of Power–Factor Tip–Up of Rotating Machinery Stator Coil Insulation", The Institute of Electrical and Electronics Engineers, Inc., (IEEE Std. 286–1975), 1975, 7–11.

"IEEE Recommended Practice for Voltage Endurance Testing of Form–Wound Bars and Coils", (IEEE 1043 Revision), Sep., 1995, 1–17 and 3 Sheets of Figures.

"Selection, Preparation & Testing of H–V (11KV & Above) Stator Quality Control Half Coils", PGBU Insulation Test Specification No. 348026, Westinghouse Electric Corporation, Orlando, Florida, 1995, 8–9 (Section 3.6).

*Primary Examiner*—Paul Thibodeau
*Assistant Examiner*—Holly C. Rickman
*Attorney, Agent, or Firm*—Eckert Seamans Cherin & Mellott, LLC

[57] ABSTRACT

A catalyzed mica tape used in insulating electrical conducting devices is made from a mica paper bonded to a backing with a bonding resin. The bonding resin is cross-linkable by an addition reaction. The catalyzed mica tape has distributed therein at least a catalyst at a concentration of greater than 0.01 g/m$^2$ for every 100 g/m$^2$ of the bonding resin. The catalyst is an organo-transition metal compound, organo-tin compound, or a combination thereof.

2 Claims, 1 Drawing Sheet

CATALYZED MICA TAPES FOR ELECTRICAL INSULATION

BACKGROUND OF THE INVENTION

1. Field of the Invention

This invention relates to the field of electrical insulation. More specifically, this invention relates to the mica tape used in insulating electrical conducting devices.

2. Description of the Related Art

The related art discloses using mica tape that has been bonded together with bonding resin as insulation for electrical conducting devices. The tape is wrapped around the devices, such as stator coils, impregnated with impregnation resin, and cured. See U.S. Pat. Nos. 3,556,925; 3,647,611; 3,801,392; 4,173,593; 4,254,351; 4,336,302; 4,374,892; 4,769,276; and 5,158,826, all of which are incorporated herein by reference in their entireties. The prior art also discloses using relatively small amount of catalysts in the impregnating resin, such as between 0.0005 and 0.005 parts of a metal acetylacetonate, to act as a latent accelerator to improve cure times. See U.S. Pat. Nos. 4,173,593 and 4,254,351.

As electrical conducting devices are being sold in a competitive market place, there is an ever pressing need to economically improve them by improving their properties.

SUMMARY OF THE INVENTION

The invention provides a catalyzed mica tape used in insulating electrical conducting devices. The catalyzed mica tape is made from a mica paper bonded to a backing with a bonding resin. The bonding resin is cross-linkable by an addition reaction. The catalyzed mica tape has distributed therein one or more catalysts at concentration of greater than 0.01 $g/m^2$ for every 100 $g/m^2$ of the bonding resin. The catalysts are organo-transition metal compounds, organo-tin compounds, or a combination thereof.

DESCRIPTION OF THE PREFERRED EMBODIMENT(S)

The present invention concerns a catalyzed mica tape containing one or more catalysts being selected from the group consisting of organo-transition metal compounds and organo-tin compounds for insulating electrical conducting devices. The use of the catalyst in the mica tape at the levels of the invention provides at least enhanced electrical and mechanical properties to the insulation.

In a preferred embodiment of the invention, the organo-transition metal compound may be an organo-chromium compound or an organo-zinc compound. In a more preferred embodiment of the invention, the organo-transition metal compound may be chromium acetylacetonate, zinc naphthenate, or zinc neodecanoate. In a preferred embodiment of the invention, the organo-tin compound may be tin acetate.

Figure 1:
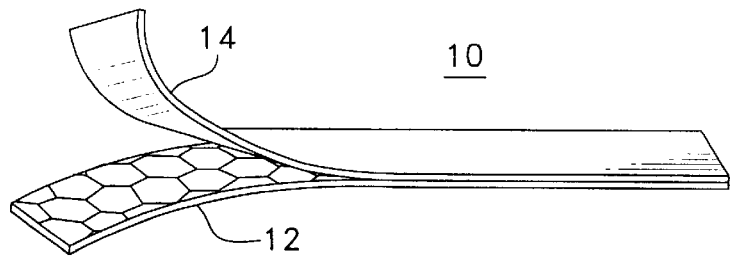
FIG. 1 shows a catalyzed mica tape of the claimed invention.

Now referring to the figures, wherein like reference numerals designate corresponding structures throughout the views, and referring in particular to FIG. 1, a catalyzed mica tape 10 is a laminate made up of mica paper 12 and glass backing 14. In a preferred embodiment of the invention, the mica paper 12 may or may not be calcined with the glass backing 14 having a non-starch treatment—preferably epoxy-silane, amino-silane, or vinyl-silane. The laminate is bound into a unitary structure by a bonding resin that is an epoxy, a polyester, or an unsaturated polyolefin, that also dissolves the catalyst. The bonding resin is partially cured, or B-staged, after it has been applied to the laminate.

The concentration of the catalyst in the catalyzed mica tape 10 is relatively high, with a minimum concentration of approximately 0.01 $g/m^2$ for every 100 $g/m^2$ of resin in the tape. A preferred embodiment of the invention may have the catalyst concentration level being approximately 2.5 to 5.0 $g/m^2$ of the tape, or more. The catalyst may be incorporated into the mica tape 10 in a number of ways. The catalyst may be dissolved in the bonding resin prior to using it to bond the mica paper 12 and the glass backing 14. The catalyst may also be incorporated into the mica paper 12 during its manufacture. The catalyst may also be applied to either the mica paper 12 or the glass backing 14 prior to or after the incorporation of the bonding resin, or after the B-staged curing thereof. Catalyzed mica tape 10 that has had the catalyst incorporated using other suitable methods may also be used in practicing the invention.

The bonding resin has a number of characteristics. The bonding resin dissolves the catalyst at the levels required to practice the invention. The bonding resin is also cross-linkable by an addition reaction, as opposed to a free radical reaction. In a preferred embodiment of the invention, the bonding resin is an epoxy, which is defined as any molecule having more than one alpha-epoxy unit. Different embodiments of the invention may use certain classes of epoxy resins, such as bisphenol A epoxy resin with a repeating bisphenol A unit, a novolac epoxy resin with multiple novolacs having multiple hydroxy groups, and a cycloaliphatic epoxy resin that has saturated cyclic hydrocarbon repeat units instead of the aromatic repeat units found in the bisphenol A epoxy resin. Depending on the particular voltage and temperature requirements in a given application, all of these classes of epoxy resins, and more, may be used in practicing the invention. A preferred embodiment of the invention may have the concentration of the bonding resin in the catalyzed mica tape 10 being between approximately 5 to 15 weight percent of the tape with an even weight distribution. In another preferred embodiment of the invention, the unsaturated polyolefin resin is 1,2-polybutadiene resin.

Figure 2:
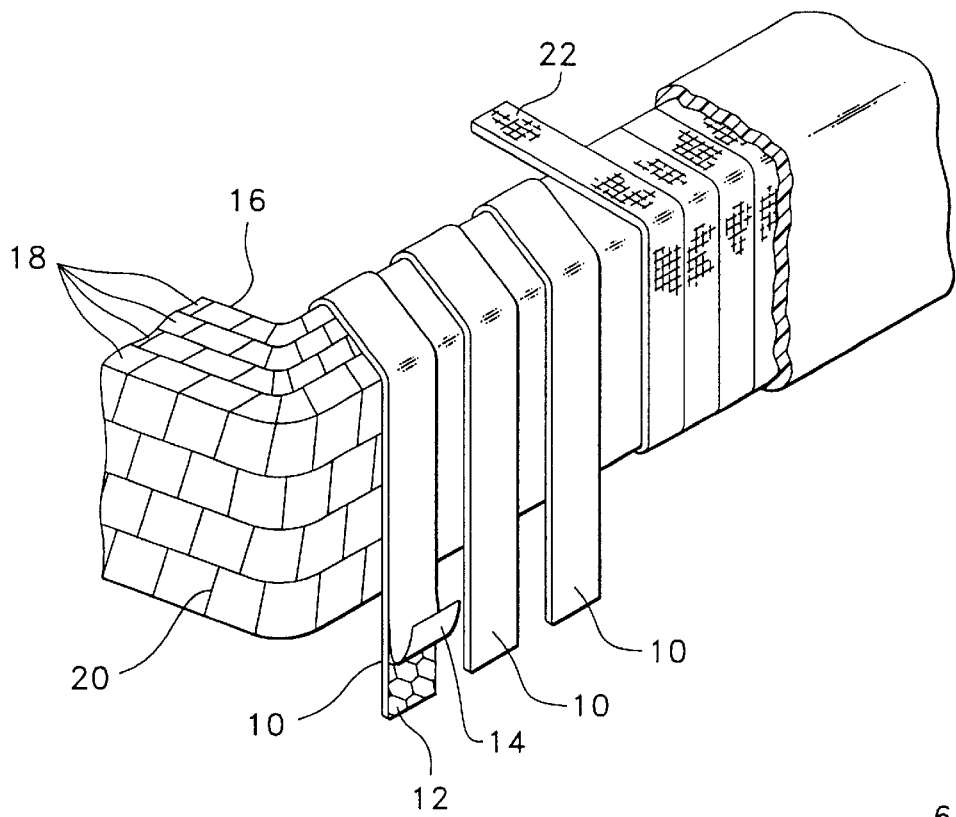
FIG. 2 shows an electrical conducting device wrapped with the catalyzed mica tape of the claimed invention.

Now referring to FIG. 2, a coil 16 according to an embodiment of the invention has a plurality of turns of conductors 18. Each turn of the conductor 18 consists essentially of a copper bar or wire wrapped with a turn insulation 20. The catalyzed mica tape 10 is then used to further insulate the coil 16. One or more layers of the catalyzed mica tape 10 is wrapped about the coil. The catalyzed mica tape 10 may be applied half lapped, abutted, or in any other suitable manner. Generally, multiple layers of the catalyzed mica tape 10 are wrapped about the coil with sixteen or more layers generally being used for high voltage coils. The number of layers may be decreased depending on the power of the generator and the effectiveness of the electrical insulator. To impart better abrasion resistance and to secure a tighter insulation, a wrapping of an outer tape 22 of a tough fibrous material, for example, glass fiber, asbestos or the like is applied to the coil.

After the coil 16 is wrapped with turn insulation 20, catalyzed mica tape 10, and outer tape 22, it is impregnated with an impregnating resin that is miscible with the bonding resin in the catalyzed mica tape 10, cross-linkable by an addition reaction, and will dissolve the catalysts in the catalyzed mica tape 10. The impregnated insulation is then cured to complete the insulation process. The impregnation/curing process, which includes vacuum tank impregnation of the impregnation resin and curing the bonding and impregnation resins, is disclosed in U.S. Pat. Nos. 4,173,593 and 4,254,351, both to Smith et al. and both entitled "Metal Acetylacetonate Latent Accelerators for an Epoxy-Styrene Resin System", both of which are incorporated herein by reference in their entireties.

Figure 3:
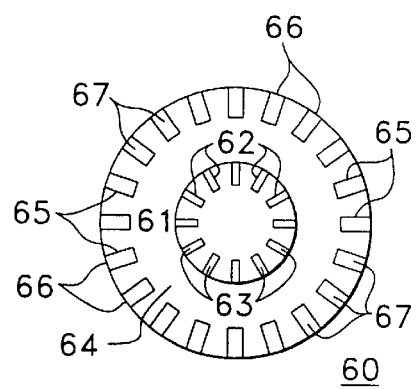
FIG. 3 shows a cross-sectional view of a motor, containing coils wound with the catalyzed mica tape impregnated with impregnating resin.

The insulated coil 16 may be used in devices requiring insulated electrical conducting devices. Now referring to FIG. 3, an embodiment of the invention is a generator 60 comprised of a metal armature 61 having slots 62 therein, containing insulated coils 63, surround by a metal stator 64 having slots 65 therein about the stator circumference at 66. The stator slots contain insulated coils 67. The above-referenced U.S. Pat. Nos. 4,173,593 and 4,254,351 disclosure additional electrical conducting devices suitable for use with the present invention.

EXAMPLE 1

Testing was preformed using two embodiments of the invention, one with chromium acetylacetonate and the other with zinc naphthenate, both at a concentration level of between 2.5 and 5.0 g/m², and a prior art mica tape. The test was performed using steel test bars that were 4'×0.5"×2". The mica tapes were all made with the same mica paper, glass backing, and bisphenol-A epoxy resin. The breakdown voltages (volts/mil) of the chromium acetylacetonate tape and the zinc naphthenate tape were 639 and 591, respectively, while the prior art mica tape had a much lower, and less desirable, breakdown voltage of 506. The breakdown voltage test determines the voltage required to breakdown the insulation.

Further testing before and after a 48 hour 155° C. thermal cycle was also preformed between the embodiments of the invention with chromium acetylacetonate and zinc naphthenate, respectively. Initially, the tape with chromium acetylacetonate had a 25° C. Tan δ% Tip-up of 0.04 and a 155° C. Tan δ% of 4.21 compared to the zinc naphthenate having a 0.20 and 3.15 respectively. After the thermal cycle, tape with chromium acetylacetonate had a 25° C. Tan δ% Tip-up of 0.40 and a 155° C. Tan δ% of 5.15 compared to the zinc naphthenate having a 0.96 and 2.60 respectively. The procedures for these tests may be found in IEEE Std 286-1975, IEEE Recommended Practice for Measurement of Power-Factor Tip-up of Rotating Machinery Stator Coil insulation, which is incorporated herein by reference in its entirety.

Additional testing of the invention found a three-fold increase in tensile strength of the impregnated and cured mica tape of the claimed invention compared to the impregnated and cured prior art mica tape. It is theorized that the reason for the increased tensile strength is that the high catalyst level in the catalyzed mica tape 10 increases the bonding between the bonding resin and the impregnating resin during curing.

EXAMPLE 2

Testing was preformed using two embodiments of the invention, one with zinc neodecanoate and the other with tin acetate, both at a concentration level of 2.5 g/m², and a prior art mica tape. The test was performed using steel test bars that were 12"×⅝" diameter. The mica tapes were all made with the same mica paper, glass backing, and bisphenol-A epoxy resin. The breakdown voltages (volts/mil) of the zinc neodecanoate tape and the tin acetate tape were 776 and 733, respectively, while the prior art mica tape had a much lower, and less desirable, breakdown voltage of 588.

Further testing before and after a 48 hour 155° C. thermal cycle was also preformed. Initially, the tape with zinc neodecanoate had a 25° C. Tan δ% Tip-up of 0.93 and a 155° C. Tan δ% of 1.96, the tape with the tin acetate had a 25° C. Tan δ% Tip-up of 0.68 and a 155° C. Tan δ% of 6.86, and the prior art mica tape had a 25° C. Tan δ% Tip-up of 1.19 and a 155° C. Tan δ% of 1.75. After the thermal cycle, the tape with zinc neodecanoate had a 25° C. Tan δ% Tip-up of 1.05 and a 155° C. Tan δ% of 1.73, the tape with the tin acetate had a 25° C. Tan δ% Tip-up of 0.56 and a 155° C. Tan δ% of 2.02, and the prior art mica tape had a 25° C. Tan δ% Tip-up of 1.43 and a 155° C. Tan δ% of 2.12.

As a result of the above discussed properties of the invention, less insulation thickness is required, permitting economically beneficial reduction in size of equipment. A further benefit of the increased levels of the catalyst in the mica tape is that the cure time is reduced, beneficially reducing manufacture time of the equipment insulated with the catalyzed mica tape.

The present invention may be embodied in other specific forms without departing from the spirit or essential attributes thereof and, accordingly, reference should be made to the appended claims, rather than to the foregoing specification, as indicating the scope of the invention.

What is claimed is:

1. A mica tape, suitable for use on an electrical conducting device, consisting of:
    a) mica bonded to a backing with a bonding resin being cross-linkable by an addition reaction, said bonding resin consisting of a resin selected from the group consisting of epoxy, polyester, and unsaturated polyolefin resins; and
    b) a catalyst being distributed in said mica tape at a concentration of approximately 2.5 to 5.0 g/m² for every 100 g/m² of said bonding resin, where said catalyst consists of chromium acetylacetonate, wherein said catalyzed mica tape is covering an electrical conducting device, and said tape-covered electrical conducting device is impregnated with an impregnation resin that is miscible with said bonding resin, cross-linkable by an addition reaction, and said catalyst is dissolvable therein.

2. The catalyzed mica tape of claim 1, wherein:
    a) said tape-covered electrical conducting device is a stator coil; and
    b) said bonding and impregnating resins are cured epoxy resins.

* * * * *